Figure 1:
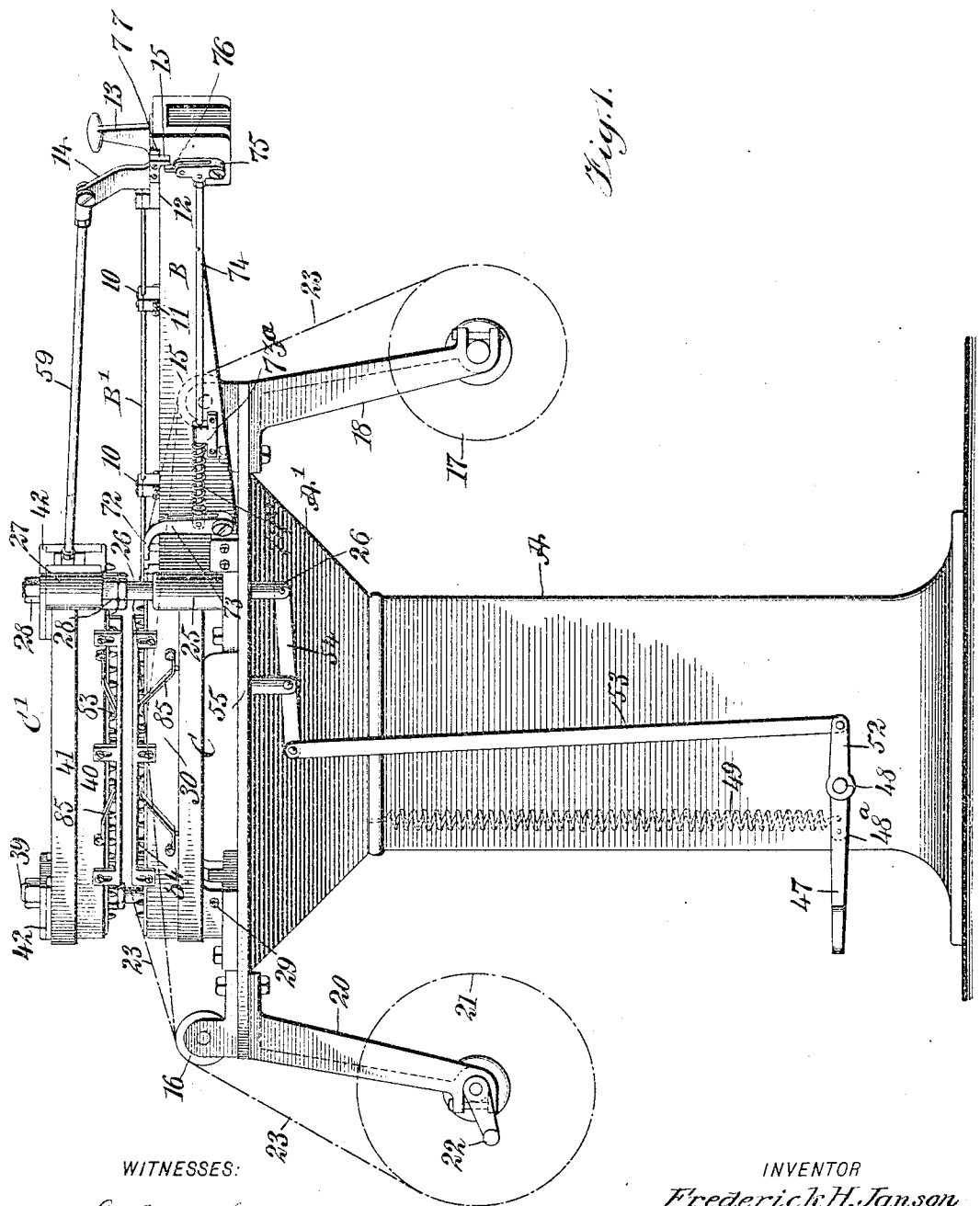

INVENTOR
Frederick H. Janson

No. 787,185. PATENTED APR. 11, 1905.
F. H. JANSON.
MACHINE FOR INSERTING DIAGONAL STRANDS IN WOVEN CANE FABRIC.
APPLICATION FILED AUG. 18, 1904.
6 SHEETS—SHEET 2.
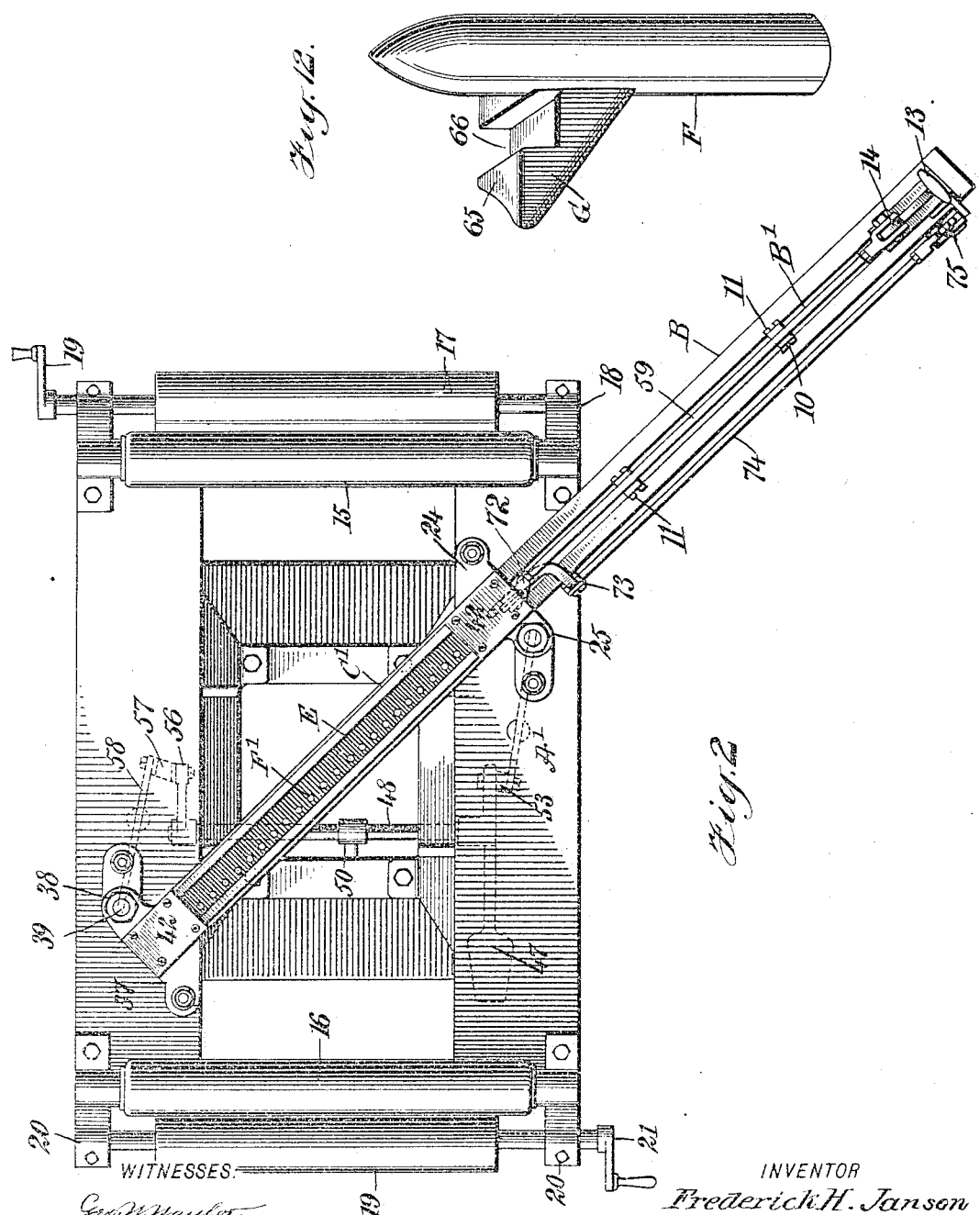
INVENTOR
Frederick H. Janson No. 787,185. PATENTED APR. 11, 1905.
F. H. JANSON.
MACHINE FOR INSERTING DIAGONAL STRANDS IN WOVEN CANE FABRIC.
APPLICATION FILED AUG. 18, 1904.
6 SHEETS—SHEET 3.
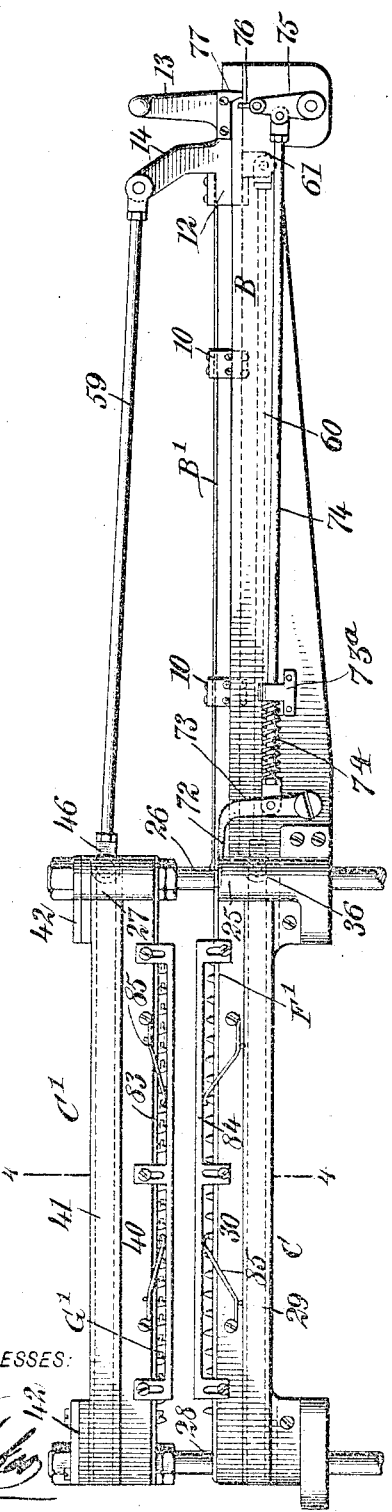
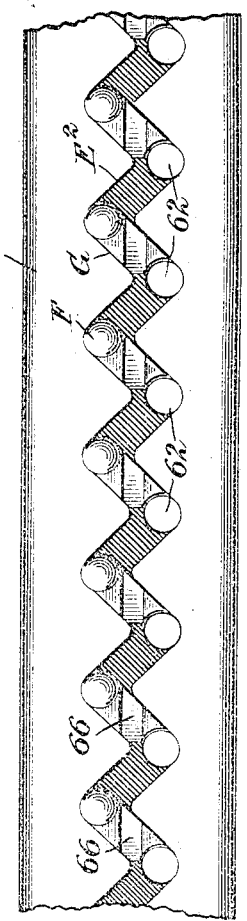
WITNESSES:
INVENTOR
Frederick H. Janson
BY
ATTORNEYS No. 787,185. PATENTED APR. 11, 1905.
F. H. JANSON.
MACHINE FOR INSERTING DIAGONAL STRANDS IN WOVEN CANE FABRIC.
APPLICATION FILED AUG. 18, 1904.
6 SHEETS—SHEET 4.
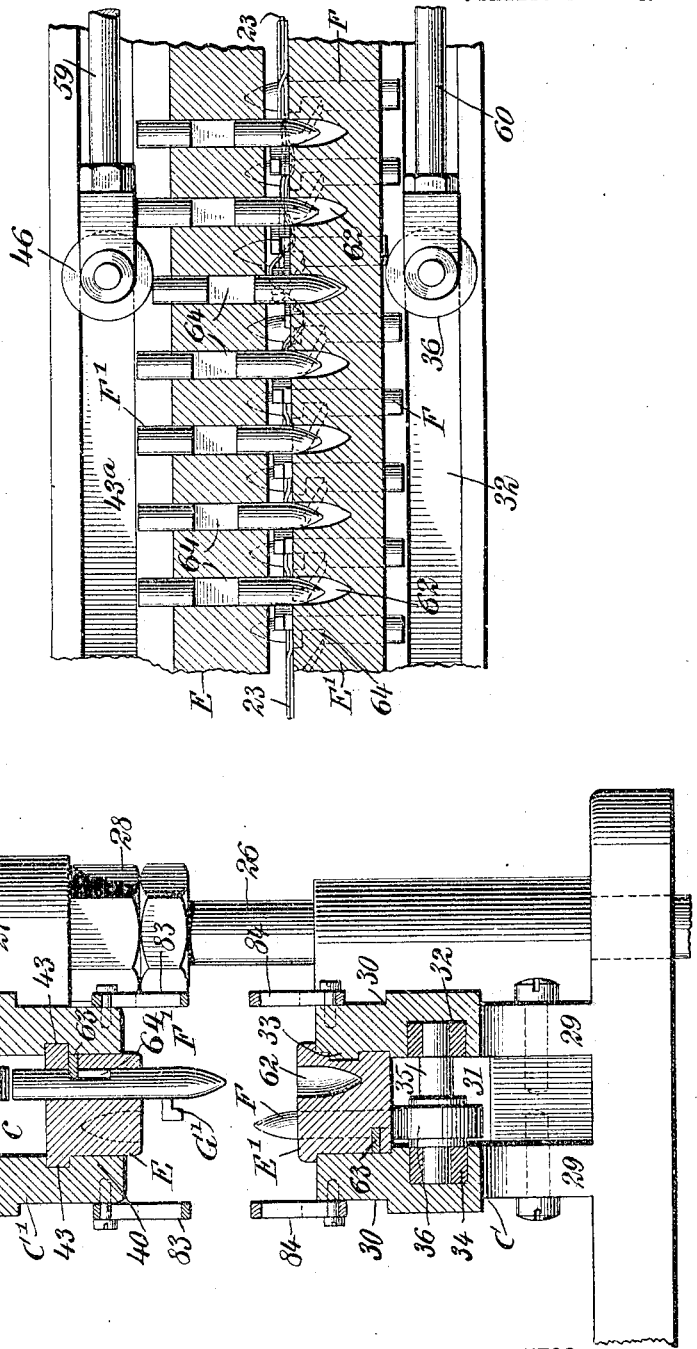
WITNESSES:
INVENTOR
Frederick H. Janson
BY
ATTORNEYS No. 787,185. PATENTED APR. 11, 1905.
F. H. JANSON.
MACHINE FOR INSERTING DIAGONAL STRANDS IN WOVEN CANE FABRIC.
APPLICATION FILED AUG. 18, 1904.
6 SHEETS—SHEET 5.
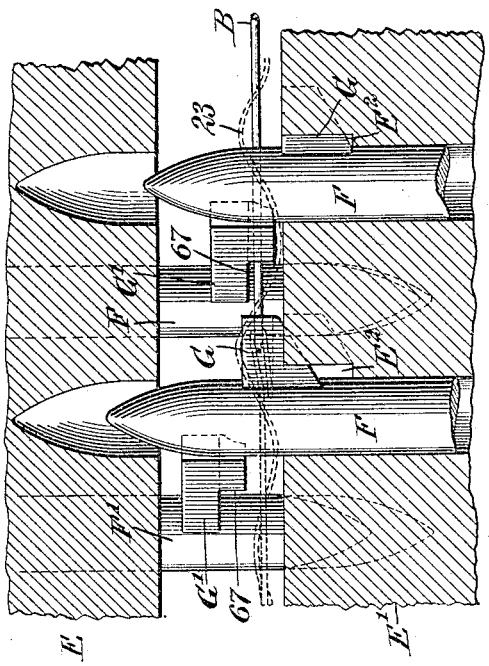
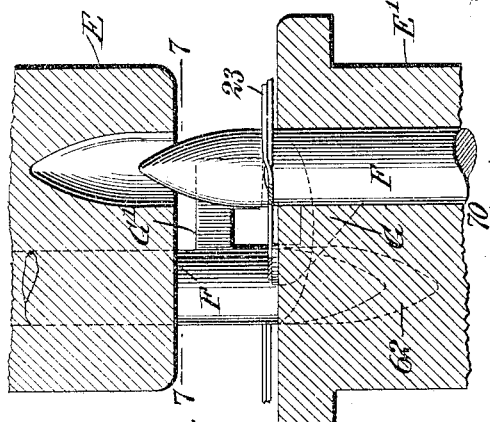
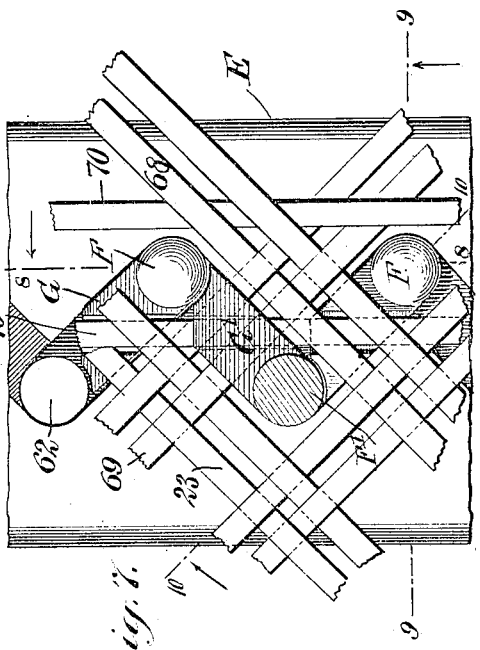
WITNESSES:
INVENTOR
Frederick H. Janson
BY
ATTORNEYS

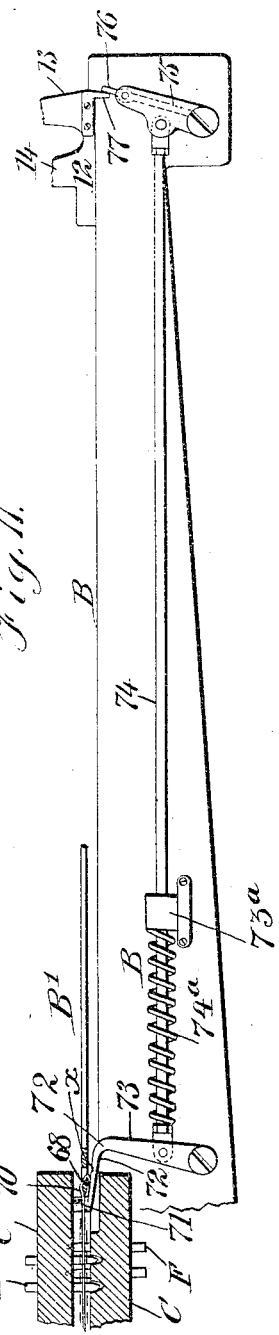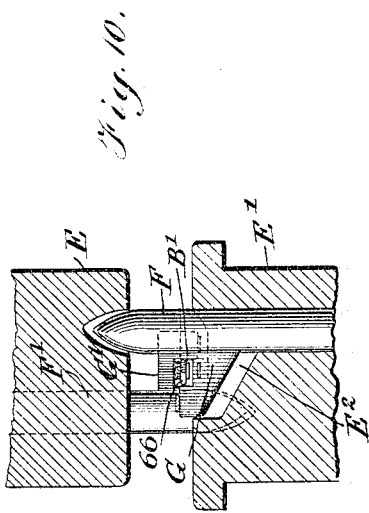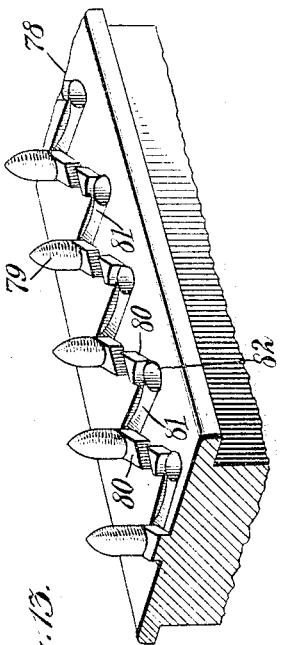

No. 787,185.

Patented April 11, 1905.

UNITED STATES PATENT OFFICE.

FREDERICK HENRY JANSON, OF NEW YORK, N. Y., ASSIGNOR TO AMERICAN RATTAN & REED MFG. CO., OF BROOKLYN, NEW YORK.

MACHINE FOR INSERTING DIAGONAL STRANDS IN WOVEN CANE FABRIC.

SPECIFICATION forming part of Letters Patent No. 787,185, dated April 11, 1905.

Application filed August 18, 1904. Serial No. 221,228.

*To all whom it may concern:*

Be it known that I, FREDERICK HENRY JANSON, a citizen of the United States, and a resident of the city of New York, borough of Brooklyn, in the county of Kings and State of New York, have invented a new and useful Improvement in Machines for Inserting Diagonal Strands in Woven Cane Fabric, of which the following is a full, clear, and exact description.

The purpose of the invention is to provide a comparatively simple and positive means for depressing the warp-strands and raising the weft-strands in woven cane fabric for the passage of a needle carrying a diagonal strand and to accomplish the object by an up-and-down movement of bars carrying guide-pins, which pins have projections for depressing the warp-strands, and said pins serve in action to hold the woven cane fabric in position and to properly separate the weft from the warp while the diagonal strands are being inserted and at the same time rectify any inaccuracies in the weave.

Another purpose of the invention is to construct a machine of the character described which will require but little repairing and in which the parts are interchangeable.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the machine. Fig. 2 is a plan view. Fig. 3 is a side elevation. Fig. 4 is a cross-section taken on the line 4 4 of Fig. 3. Fig. 5 is a detail longitudinal section through a portion of the pin-bars. Fig. 6 is a plan view of one of the pin-bars. Fig. 7 is a sectional plan view, the section being taken on the line 7 7 of Fig. 9. Fig. 8 is a section taken on the line 8 8 of Fig. 7. Fig. 9 is a section taken on the line 9 9 of Fig. 7. Fig. 10 is a detail cross-section through the pin-bars, the section being taken on the line 10 10 of Fig. 7. Fig. 11 is a detail view of the rear portion of the projecting arm carrying the pin-bars, showing the grip gripping the strand and the strand drawn through the needle. Fig. 12 is a detail view of one of the pins, and Fig. 13 is a perspective view of a modified form of the pin-bar.

A represents a pedestal provided with a broad bed A' at the top, and B represents an extension-arm projected diagonally from the end front portion of the said bed A'.

B' represents a needle adapted to carrying the diagonal strand, which needle is loosely passed through carrier or supporting blocks 10, having friction-rollers 11, enabling the said blocks to travel upon the upper surface of the extension-arm, as is shown in Figs. 1 and 2. The carrier or supporting blocks consist each of an upper bearing-section through which the needle loosely passes and a body-section on which the friction-rollers are mounted, and these rollers travel directly upon the extension-arms, as is shown in Fig. 1, and are stopped in their movement as required by suitable checks common to this construction. These blocks are independent one of the other and are adapted to support the needle between its ends when the needle is in its normal position, (shown in Fig. 1;) but when the head of the needle is at the other end of the machine and in position to receive a diagonal strand the carrier or supporting blocks 10 are brought close together in the usual or in any approved manner, as such blocks are common to other machines of like type. The heel or rear end of the needle B' is secured to a slide 12, having a thumb-piece 13, so that the slide can be moved on the extension-arm, and consequently the needle. A stud 14 is extended upward from the said slide, as is shown in Figs. 1 and 3.

At one end—the right-hand end—of the bed A' a guide-roller 15 is journaled, and an opposing roller 16 is journaled at the opposite end of the said bed, and below the guide-roller 15 a drum 17 is detachably mounted in arms 18, extending downward from the bed and provided with a crank-arm 19 at one end. Below the opposing guide-roller 16 a second drum 21 is mounted, which drum is also removably placed in arms 20, extending downward from the said bed, as is shown in Fig. 1, the said drum 21 having a crank-handle 22 likewise attached. The drums 17 and 21 are parallel, and the cane fabric is rolled from one drum onto the other longitudinally, crossing the central portion of the bed, and said fabric is likewise passed over a fixed box C, to be hereinafter described, said box being a rear continuation of the extension-arm B. Consequently the box C has a diagonal relation to the span of cane fabric crossing the bed, as is evident from the construction shown in Fig. 1.

A bracket 24 is diagonally secured on the base at the forward right-hand portion of the base at the inner end of the extension-arm B, and this bracket is provided near its forward edge with an integral sleeve 25, fixed to the bracket, through which sleeve and above the same a stud 26 is loosely passed. The said stud enters a second and upper sleeve 27, which is firmly secured to the stud or upright shaft 26 by means of suitable nuts 28.

A fixed box C is employed, located diagonally of the bed A' and extending from the inner end of the extension-arm to the opposite side of the bed, and this lower fixed bed C consists of a lower arch-section 29, secured to the bed A', and an upper section 30, both sections being provided with a central longitudinal slot or opening 31, as is shown in Fig. 4. In opposing sides of the upper section 30 longitudinal parallel grooves 32 are produced, and in one side of the slot 31, near the top of the said section 30 of the fixed box C, a longitudinal rib or tongue 33 is produced. Friction-rollers 34, mounted on a shaft 35, travel in the grooves 32, and on this shaft 35, nearer one end than the other, an operating-roller 36 is mounted to turn.

At the rear end of the lower fixed box C a bracket 37 is diagonally located, corresponding to the bracket 24, and a sleeve 38, corresponding to the sleeve 25 on the bracket 24, is formed on the bracket 37, but on the opposite side, and a vertical shaft 39, corresponding to the shaft 26, has free movement in this sleeve, but at its upper end is attached to the sleeve 38 by means of suitable nuts, the attachment being made in a corresponding manner to the attachment of the upper sleeve 27 at the front right-hand end of the box.

The upper sleeves 27 and 38 support an upper box C', which is parallel with the lower box C and is adapted for movement to and from the said lower box. This upper box C' consists of a lower or reduced section 40 and an upper or enlarged section 41, and the said upper box C' is further provided with a slot c, extending through from end to end, and a further attachment of the upper box to the upper sleeves 27 and 38 is made through the medium of plates 42.

In opposite sides of the lower section 40 of the upper box C' opposing grooves 43 are made in the walls of the slot c, and larger grooves 43ª are similarly produced in the upper section 41 of the said upper box C'. In the upper grooves 43ª friction-rollers 44 are located, mounted on a shaft 45, which shaft carries an operating-roller 46 between its ends, the operating-roller being mounted to turn on the shaft 45. This operating-roller 46 is near one end of the shaft 45, and the operating-roller 36 in the lower box is near the opposite end of its shaft 35.

The upper box C' is raised and lowered in the following manner: A foot-treadle 47 is mounted on a shaft 48, which extends into the inner portion of the pedestal A and is there provided with a crank extension 48ª, to which a spring 49 is secured, the other end of the spring being attached to any support within the upper portion of the pedestal. A crank-arm 52 extends from the shaft 48 and in opposite directions to the treadle 47, and a link 53 is connected to the crank-arm 52, which link is connected at its upper end to a lever 54, the opposite end of the lever being pivotally attached to the lower end of the shaft 26, which is connected with the upper fixed box C'. At the opposite end of the shaft 48 a second crank-arm 56 is located, and a link 57 is carried upward from this crank-arm and is pivotally attached to one end of a lever 58, and this lever is attached in its turn to the lower end of the other vertical shaft, 39, connected with the said movable box C', as is shown by dotted lines in Fig. 2.

The upper roller 46 is moved by means of a rod 59, rigidly connected with the roller-supports and pivotally connected with the arm 14, extending upward from the needle-slide 12, and the operating-roller 36 in the lower box C is connected with a rod 60, (shown by dotted lines in Fig. 3,) said rod 60 being secured to a stud 61, which extends down from the lower portion of the slide 12. These two rollers 36 and 46 are always directly one above the other and always occupy a position just in advance of the eye of the needle, and as the needle is moved in inserting a diagonal strand between the fixed and movable boxes the rollers move with the needle.

In connection with the lower fixed box C a pin-bar E' is removably located therein, being adapted to be slid into or out from the box when desired, and this pin-bar carries pins F, rests upon the upper face of the box, and is provided with a groove to receive the rib 33, heretofore referred to. Similar pins F' are located in an upper pin-bar E, having ribs which slide in the grooves 43 of the upper movable box C'. The pins F and F' are held with suitable play in the pin-bars by means of keys 63 entering the said pin-bars and recesses 64 in the sides of the pins, as is shown particularly in Fig. 4. The bottom pin-bar E', as is shown in Fig. 6, is provided with a zigzag or serpentine groove E², and a row of pins F is loosely mounted in apertures produced at the pointed portions of the said recess or groove adjacent to one side edge of the bar, while at the pointed portions of the recess or groove adjacent to the opposite side of the bar apertures 62 are produced, adapted to receive the pins on the upper pin-bar. The pins extend clear through the pin-bars, and the lower pins F are engaged by the lower roller 36 one after the other, while the pins of the upper pin-bar are engaged by the upper roller 46 simultaneously, also one after the other. The pins F, as is shown in detail in Fig. 12, are provided with fingers G, adapted to enter the grooves E² and extend to an opposing opening 62, all of the said fingers extending in the same direction. The upper faces 65 of these fingers are flat and are provided with transverse grooves 66, through which grooves the needle passes, and the combined grooves 66 constitute a pathway for the needle. The upper pins are provided likewise with fingers G', and these fingers extend in a contrary direction to the fingers G on the lower pins and are adapted to enter the blank spaces in the groove E² of the lower bar. The said upper fingers are flat at the top and at the bottom and at their bottom portions are provided with grooves 67 to admit of the passage of the needle, the said grooves when the two bars are brought together being in alinement with the grooves 66 in the fingers of the lower pins. As the bars are brought together in the manner which has been described the fingers of the upper pins F' engage with the warp 69, pressing the same downward, while the fingers on the lower pins F engage with the weft and press the same upward, as is shown in Fig. 7, thus making a passage-way for the needle by depressing the warp and raising the weft, which as the needle passes onward is done by the rollers 36 and 46 engaging with the needles one after the other, as is shown in Fig. 5. In Fig. 9 I have illustrated the upper bar as being permitted to drop sufficiently for the pins to pass through the meshes of the material, after which the two bars are brought close enough together to cause the fingers to act on the warp and weft in the manner shown in Fig. 8, wherein one set of fingers are in action and the other set of fingers are about to be brought into action, and the needle is shown between the two sets of fingers. When the material is to be placed on the pins of the lower pin-bar, the upper movable box is carried sufficiently upward to permit the cane to be readily placed in position on the machine.

The diagonal strands are shown in Fig. 7, and in Fig. 11 one strand is shown in the needle just being drawn through and in position to be cut at the eye of the needle. This is accomplished by forcing the strand upward against a bearing or table block 71 at the under face of the upper pin-bar by means of a foot 72 on an angle-lever 73. Thus the strand is held fast while the needle makes its full rearward outward throw, and the strand is cut quickly by the eye of the needle, which may be sharpened for that purpose. The cutting-section of the needle is the wall of the eye nearest the point, as is shown at $x$ in Fig. 11. The lever 73 is actuated by a connecting-rod 74, having movement in a suitable guide 73ª on the extension-arm B and pivotal connection with a trip-lever 75, fulcrumed at the outer end portion of the extension-arm, the said lever 75 being provided with a counterbalance-pin 76, which extends above the upper edge of the lever, being pivoted in a suitable chamber produced in said lever 75, as is shown in Fig. 1 and by dotted lines in Fig. 11. The chamber for the counterbalance-pin 76 is open at the front and closed at the back, so that the pin is compelled to occupy a stationary position when pushed forward, as shown in Fig. 11. Its lower end, however, is free to move out from the said chamber in said lever 75 when the pin is pushed rearward at the top. The foot 72 of the clamping-lever 73 is normally held away from the bearing or table block 71 by a spring 74ª, which is coiled around the rod 74, bearing against the guide 73ª and the lever 73, as is shown by Figs. 1 and 11. The upper end of the counterbalance-pin is adapted to be engaged by a finger 77, extending downward from the needle-slide 12. In Fig. 1 the counterbalance-pin 76 and the needle B' are shown in their normal positions, or the position from which the needle is to start to receive a diagonal strand and to draw the strand back through the woven cane fabric, and when the parts are in such position the finger 77 is at the front of the upper end of the pin 76, and the spring 74ª will then hold the clamping-lever 73 in such position as to carry the foot 72 away from the bearing or table block 71. When the needle is started rearward, the finger 77 will simply slide over the pin 76, and the pin will immediately restore itself to its upright position. (Shown in Fig. 1.) After the needle has received the diagonal strand and has been carried forward, thus drawing said strand through the fabric, as the eye of the needle reaches the outer forward edge of the fabric the finger 77 on the needle-slide 12 will engage with the rear face of the projecting portion of the pin 76 and will attempt to force the said pin forward, and the said pin being prevented from moving rearward at its lower end will carry the trip-lever 75 to a downwardly and rearwardly inclined position, (shown in Fig. 11,) thus drawing the connecting-rod 74 forward, which rod carried the clamping-lever 73 likewise in a forward direction, bringing the foot of the said clamping-lever 73 against the under face of the diagonal strand, forcing the upper face of the diagonal strand to an engagement with the bearing or table block 71.

The diagonal strand is thus held while the needle moves farther forward a slight distance, or a sufficient distance to cause the finger 77 to clear the pin 76, and at this extreme forward movement of the needle the eye of the needle will tear or cut itself away from the placed diagonal strand, and as soon as the finger 77 clears the pin 76 the spring 74$^a$ acts to restore the trip-lever 75 to its normal position and likewise the clamping-lever 73.

It may be here remarked that there is no necessity of a groove in the under face of the upper pin-bar, as the fingers on the upper pins just barely approach such face.

In Fig. 13 I have illustrated a slight modification in the formation of the lower pin-bar, wherein the pins are fixed or integral with the bar and the fingers 80 are in the form of lugs separated by suitable spaces, and between the pins are openings 82 at the opposite side of the bar adapted to receive the upper pins, and recesses 81 are formed to receive the fingers of the said upper pins. Guards 83 and 84 are located at each side of the said fixed boxes longitudinally thereof and have sliding movement on the said boxes in a vertical direction at the lower edges of the boxes. These guards face one another and are pressed in direction of each other by springs 85. In closing the upper movable box C' upon the lower fixed box C the upper guards are forced upward and the lower guards downward, thus placing the springs under tension, and these guards then press on the woven material and hold it firmly in place, permitting a perfect action of the pin-bars. When the two boxes C' and C are separated, the springs carry the guards to their normal position, (shown in Fig. 1,) the upper guards serving to strip the cane from the upper pins and the lower guards to remove the cane from the lower pins, so that there is no difficulty in detaching the cane from the pins in order to pass out or to receive other diagonal strands.

Having specifically described the operation of the various parts, I will now give a brief description of the general operation of the machine. The needle B' is carried to its normal position, (shown in Fig. 1,) the upper pin-bar E is raised by pressing down upon the pedal 47, and the woven cane fabric is carried from the supply-drum of the machine to the take-up drum and over the lower pin-bar E', the pins F of which lower pin-bar E' are made to pass upward through convenient openings in the woven cane fabric, as is shown in Fig. 7. The upper pin-bar E is now permitted to drop, causing the pins F' carried thereby to pass downward through openings in the fabric adjacent to those openings which received the pins of the lower pin-bar, the said parts being then practically in the position shown in Fig. 8. It will be remembered that the rollers 36 and 46, which are adapted, respectively, to simultaneously raise the pins in the lower pin-bar E' and press downward the pins in the upper pin-bar E, are in substantially vertical alinement with the eye of the needle and that these parts are all operated simultaneously by the movement of the slide 12 and its stud 14. The parts being as above described, as the slide is carried rearward, usually by hand, the rollers 36 and 46 operate in the manner just mentioned upon the pins F and F' as the various pins are reached, causing the fingers of the upper pins F', which engage with the warp, to press the same downward, while the fingers of the lower pins F, which engage with the weft-strands, press the same upward, thus making a passage for the needle through the fabric. The needle remains in such passageway until its eye, which has passed the rear edge of the fabric, is threaded with a diagonal strand. The needle is now carried forward and draws the diagonal strand through the passage-way made for it until when the eye of the needle reaches the forward edge of the fabric the slide 12 acts upon the clamping-lever 73, causing the said lever to clamp the diagonal strand close to the eye of the needle between itself and the bearing block or table 71, as is illustrated in the drawings by Fig. 11. The slide and needle travel further forward, and this movement causes the needle to cut itself away from the diagonal strand, whereupon the action of the slide 12 on the clamping-lever 73 ceases and the latter resumes its normal position, being forced to such position by the spring 74$^a$. The upper pin-bar is now again raised, the cane fabric is shifted, and the operation is continued as has been described.

Having thus described my invention, I claim as new and desire to secure by Letters Patent—

1. In a machine for inserting diagonal strands in woven cane fabric, supports one of which is movable to and from the other, conjointly and oppositely operating sets of pin devices loosely mounted in the supports, the pins of one set acting to depress the warp-strands while the pins of the other set raise the weft-strands, a needle which carries the strand to be diagonally placed, and means for moving the needle concertedly with the action of the said devices, passing over the depressed warp-strands and under the raised weft-strands.

2. In a machine for inserting diagonal strands in woven cane fabrics, bars, means for moving the bars one toward the other, pins movable in the bars, adapted to pass through the meshes of the fabric, and fingers carried by the pins, one set of fingers being adapted to depress the warp-strands and the other set to raise the weft-strands.

3. In a machine for inserting diagonal strands in woven cane fabrics, bars, means for moving the bars one toward the other, pins movable in the bars, adapted to pass through the meshes of the fabric, fingers carried by the pins, one set of fingers being adapted to depress the warp-strands and the other set to raise the weft-strands, and independent yet concertedly operating means for lifting action on one set of pins and depressing the pins of the other set.

4. In a machine for inserting diagonal strands in woven cane fabric, upper and lower bars, one adjustable relative to the other, a series of pins carried by each bar, the pins of one bar being adapted to enter openings in the opposing bar, fingers located on the pins of each bar and inclined in opposite directions, the fingers of the lower bar having diagonal recesses in their upper faces and the fingers of the upper bar having similar recesses in their under faces, a needle arranged to be guided through the combined recesses of all of the fingers, and means for depressing the upper fingers and raising the lower fingers in pairs to depress the warp-strands and raise the weft-strands.

5. In a machine for inserting diagonal strands in woven cane fabric, upper and lower bars, one adjustable relative to the other, a series of pins carried by each bar, the pins of one bar being adapted to enter openings in the opposing bar, fingers located on the pins of each bar, but inclined in opposite directions, the fingers of the lower bar having diagonal recesses in their upper faces, and the fingers of the upper bar having similar recesses in their under faces, a needle arranged to be guided through the combined recesses of all of the fingers, and means for depressing the upper fingers and raising the lower fingers in pairs to depress the warp-strands and raise the weft-strands, which means have movement slightly in front of the eye of the needle and movement concertedly with the needle.

6. In machines for inserting diagonal strands in woven cane fabric, a lower bar having a zigzag groove longitudinally located therein, pins at the pointed portions of one side of the groove, openings being provided at the points of the groove at the opposite side, slotted fingers carried by the pins, all inclined in the same direction and entering corresponding stretches of the groove, a mating bar having pins to enter the openings in the bottom bar and openings to receive the pins of the lower bar, the upper pins having fingers oppositely inclined to those on the lower bar, being adapted in action to reach points over the said groove.

7. In machines for inserting diagonal strands in woven cane fabric, a lower bar having a zigzag groove longitudinally located therein, pins at the pointed portions of one side of the groove, openings being provided at the points of the groove at the opposite side, slotted fingers carried by the pins, all inclined in the same direction and entering corresponding stretches in the groove, a mating bar having pins to enter the openings in the bottom bar and openings to receive the pins of the lower bar, the upper pins having fingers oppositely inclined to those on the lower bar and being adapted in action to reach points over the said groove, all of said fingers having corresponding recesses in their vertically-opposing faces, and a needle and means for moving the needle through said recesses.

8. In a machine for inserting diagonal strands in woven cane fabric, a pin, a support in which the pin has movement, and a finger extending from the pin and having a recess in one of its faces.

9. In a machine for inserting diagonal strands in woven cane fabric, upper and lower bars, means for moving one of the bars, pins having movement in the said bars, a track adjacent to the outer ends of the pins, rollers supported by the said tracks, which rollers are in substantially vertical alinement and are adapted to engage with the inner ends of the said pins, a needle adapted to pass along the lower bar between the pins, an actuating device for the needle, and means controlled by said device for simultaneously imparting movement to the rollers on their tracks.

10. In a machine for inserting diagonal strands in woven cane fabric, upper and lower boxes, bars removably located in said boxes, pins having movement in said bars, extending out below the bottom of the upper bar and above the top of the lower, fingers carried by the pins, rollers, means for moving said rollers in the said boxes in engagement with the outer ends of the pins, the rollers being in substantially vertical alinement, a needle the head of which is just to the rear of the said rollers, a device for operating the needle, and means operated by said device for imparting rolling motion to the rollers.

11. In a machine for inserting diagonal strands in woven fabric, bars between which the fabric is placed, pins sliding in the said bars, adapted to pass through the meshes of the fabric, fingers carried by the said pins, the fingers of the upper pins acting to depress the warp-strands and the fingers of the lower pins to elevate the weft-strands, a needle having guided movement through the fingers, an actuating device for the needle, and means for pressing on the outer ends of the pins simultaneously in pairs, the said means for operating the pins having concerted movement with the needle and occupying a position in advance of the needle-point.

12. In machines for inserting diagonal strands in woven cane fabrics, upper and lower bars, one having movement relative to the other, depressing and elevating devices carried by the said bars, guards having sliding movement on the side faces of the bars where the said devices are located, and springs bearing against the said guards, the guards acting to clamp the fabric when the bars are brought together, and as the bars are separated to strip the fabric from the retaining means.

13. In machines for inserting diagonal strands in woven cane fabric, upper and lower pin-carrying bars, means for carrying one bar in direction of the other, guards having limited movement on the said faces of the bars at their pin-carrying surfaces, springs on the upper bar having downward pressure on the upper guards, and springs on the lower bar having upward pressure on the lower guards, the working faces of the guards being normally held, those of the upper bar below the pin-carrying faces and those of the lower bar above the pin-carrying faces.

14. In a machine for inserting diagonal strands in woven cane fabrics, bars, means for moving one bar to and from the other, pins movable in the bars, the movement of the pins being to and from opposing bars, said bars being apertured to receive opposing pins, offsets from the pins, acting one set to depress warp-strands and the other set to raise weft-strands, and independent and concertedly operating roller devices having lifting action on one set of pins and depressing action on the other set.

15. In a machine for inserting diagonal strands in woven cane fabric, a support, a pin having movement in the support, and an offset from the pin having a needle-path therein.

16. In a machine for inserting diagonal strands in woven cane fabric, a centering-pin adapted to enter an opening in the cane fabric, and an offset carried by the pin, which offset operates upon a strand of the fabric to raise or to depress the same.

17. In a machine for inserting diagonal strands in woven cane fabrics, an upper and a lower bar, means for moving one bar to and from the other, the fixed bar having a needle-path therein, pins movable in the said bars, acting at opposite sides of the needle-path, each bar having recesses to receive the pins of the opposing bar, offsets from the pins, and devices exerting lifting action on one set of pins and depressing action upon the other set.

18. In a machine for inserting diagonal strands in woven cane fabrics, an upper and a lower bar, means for moving one bar to and from the other, the fixed bar having a needle-path therein, pins movable in the said bar, acting at opposite sides of the needle-path, each bar having recesses to receive the pins of the opposing bar, offsets from the pins, a needle mounted to travel in said needle-path, and devices which act independently yet concertedly upon the pins, lifting one set and depressing the other, said devices being in alinement with the eye of the needle, and means for operatively connecting said devices with the needle.

In testimony whereof I have signed my name to this specification in the presence of two subscribing witnesses.

FREDERICK HENRY JANSON.

Witnesses:
WILLIAM M. ADLER,
FREDERIC GROSS.